UNITED STATES PATENT OFFICE.

FRANK S. WASHBURN, OF NASHVILLE, TENNESSEE.

PROCESS OF MAKING AMMONIUM PHOSPHATE.

1,115,044.　　　　Specification of Letters Patent.　　Patented Oct. 27, 1914.

No Drawing.　　　Application filed June 9, 1914. Serial No. 844,017.

*To all whom it may concern:*

Be it known that I, FRANK S. WASHBURN, a citizen of the United States, residing at Nashville, in the county of Davidson and State of Tennessee, have invented certain new and useful Improvements in Processes of Making Ammonium Phosphate; and I do hereby declare the following to be a full, clear, and exact description of the invention, such as will enable others skilled in the art to which it appertains to make and use the same.

This invention relates to a process for making ammonium phosphate from crude phosphoric acid such as that obtained from the treatment of phosphate rock in electric or other furnaces, or from other sources, and has for its object to produce said ammonium phosphate in a manner less costly and more efficiently than has been heretofore accomplished.

With these and other objects in view the invention consists in the novel steps and combinations of steps more fully hereinafter disclosed and particularly pointed out in the claims.

The manufacture of ammonium phosphate has been heretofore accomplished by the neutralization of crude phosphoric acid with aqua ammonia, or with gaseous ammonia, all as is disclosed in my application No. 824,517, filed March 13, 1914, now Patent No. 1,103,115 dated July 14, 1914, and entitled Fertilizers and processes of producing same. But as is well known both aqua ammonia and gaseous ammonia are somewhat costly for this purpose, and therefore in this invention in order to avoid this objection I substitute the cheaper form of ammonia, known as gas house liquor. Further, in the manufacture of coal gas or in the manufacture of coke in a by-product oven, a considerable proportion of the nitrogen in the coal passes off in the gas in the form of ammonia. This combines with various other ingredients in the gas carrying it, and in the form of these complex compounds, this said ammonia is absorbed in the washer, and the solution is known as crude gas house liquor. An analysis of such liquor shows it to contain free ammonia, ammonium carbonate, ammonium sulfid, ammonium sulfate, ammonium thiosulfate, ammonium thiocarbonate, ammonium sulfocyanid, ammonium ferrocyanid, tarry matter, phenols, and pyridins. This liquor is usually concentrated in stills by the use of lime and steam up to a considerable strength, say 15 to 20% $NH_3$, at the gas works, and it is then sometimes known as concentrated gas liquor. This said concentration causes most of the ammonia to assume the forms of carbonates, sulfids and similar volatile forms, and at the same time it removes the bulk of the miscellaneous organic impurities. But the liquor is very impure and in no sense can it be compared to aqua ammonia in its efficiency. It however, is probably the cheapest form of ammonia on the market at the present time, and therefore a system of successfully using it in its crude state is commercially, very desirable.

I have found that if the above concentrated gas liquor is added to crude phosphoric acid, there occurs a violent reaction caused by the decomposition of the carbonates and sulfids; but as the neutralization is carried to completion the hydrogen sulfid set free, reacts with the impurities such as iron and alumina in the phosphoric acid, thereupon bringing down a black, insoluble compound practically impossible of filtration, and extremely disagreeable to handle because of its action upon the human skin. At the same time the solution is also found to be seriously contaminated by the contained pyridins, phenols, etc. In order to remove these objectionable properties, in the making of ammonium phosphate from the above crude phosphoric acid, I preferably render the latter boiling hot and bubble steam through the mass of the said acid while adding said concentrated gas house liquor, and for a few minutes after such addition of liquor has ceased. By this method of operating one drives off very quickly the carbon dioxid and the hydrogen sulfid, and also oxidizes any remaining sulfids and cyanogen compounds that may be present. At the same time the organic compounds are also removed. By proceeding as just outlined, instead of obtaining a black, slimy precipitate which cannot be successfully filtered out, I obtain a much less bulky precipitate, having a light color and a granular form, and one which contains very little insoluble phosphoric acid.

If the crude ammonia addition is regulated by the use of methylorange as an indicator no loss of ammonia need occur in the process. Further if the resulting ammonium phosphate product is to be used for fertilizer purposes it will be found to be free from all deleterious compounds.

After the above light colored precipitate is produced, I may recover the ammonium phosphatic mass or compound in any suitable manner, as by evaporating the solution, or sludge, to dryness; or I may in some cases filter out the precipitate and then dry the residue.

It is obvious that those skilled in the art may vary the details of the above process without departing from the spirit of my invention and therefore I do not wish to be limited to the above disclosure except as may be required by the claims.

What I claim is:—

1. The process of producing ammonium phosphate from crude phosphoric acid and gas house liquor which consists in adding said liquor to said crude phosphoric acid while passing steam through said acid, substantially as described.

2. The process of producing ammonium phosphate from crude phosphoric acid and gas house liquor, which consists in heating said acid substantially to its boiling point, and adding said liquor to said acid while causing steam to bubble through the mass of said acid, substantially as described.

3. The process of producing ammonium phosphate from crude phosphoric acid and concentrated gas house liquor which consists in heating said crude phosphoric acid to the boiling point; adding said liquor to the boiling hot acid; and bubbling steam through said acid during the addition of said liquor and for a few minutes after said addition has ceased, substantially as described.

4. The process of producing ammonium phosphatic compounds suitable for fertilizer purposes which consists in adding concentrated gas house liquor to hot crude phosphoric acid while passing steam through the mass until the latter takes on a light color, substantially as described.

5. The process of producing ammonium phosphatic compounds which consists in adding gas house liquor to boiling hot crude phosphoric acid and bubbling steam through the mass until substantially all the volatile impurities have been removed, substantially as described.

6. The herein described new fertilizer product formed by adding concentrated gas house liquor to boiling hot crude phosphoric acid while bubbling steam through the mass, thereby producing a light precipitate; and suitably recovering said precipitate in a dry state, substantially as described.

In testimony whereof I affix my signature, in presence of two witnesses.

FRANK S. WASHBURN.

Witnesses:
K. F. COOPER,
S. WARREN MAYS.